(12) United States Patent
Crockett et al.

(10) Patent No.: US 9,892,202 B2
(45) Date of Patent: Feb. 13, 2018

(54) WEB PAGE LOAD TIME REDUCTION BY OPTIMIZED AUTHENTICATION

(75) Inventors: Sterling Crockett, Bothell, WA (US); Arye Gittelman, Mercer Island, WA (US); Dillon Nugent, Shoreline, WA (US); Kfir Ami-ad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 505 days.

(21) Appl. No.: 13/358,397

(22) Filed: Jan. 25, 2012

(65) Prior Publication Data

US 2013/0191498 A1 Jul. 25, 2013

(51) Int. Cl.
*G06F 15/16* (2006.01)
*G06F 17/30* (2006.01)

(52) U.S. Cl.
CPC ................................ *G06F 17/3089* (2013.01)

(58) Field of Classification Search
CPC .................................................. G06F 17/3089
See application file for complete search history.

(56) References Cited

U.S. PATENT DOCUMENTS

| | | | |
|---|---|---|---|
| 7,296,051 B1 | 11/2007 | Kasriel | |
| 7,392,325 B2 | 6/2008 | Grove et al. | |
| 7,703,015 B2 | 4/2010 | McKellar et al. | |
| 7,765,274 B2 | 7/2010 | Kasriel et al. | |
| 7,831,556 B2 | 11/2010 | Behl et al. | |
| 2003/0104830 A1* | 6/2003 | Norwood et al. | 455/517 |
| 2003/0140049 A1* | 7/2003 | Radatti | 707/100 |
| 2005/0022227 A1* | 1/2005 | Shen et al. | 725/28 |
| 2005/0210243 A1* | 9/2005 | Archard | H04L 63/0428 713/160 |
| 2006/0212514 A1 | 9/2006 | Saillet | |
| 2008/0005086 A1* | 1/2008 | Moore | 707/3 |
| 2008/0008211 A1* | 1/2008 | Zilbershtein et al. | 370/466 |
| 2008/0163368 A1* | 7/2008 | Harris et al. | 726/21 |
| 2010/0093622 A1* | 4/2010 | Lidgren | 514/12 |
| 2010/0146299 A1* | 6/2010 | Swaminathan et al. | 713/189 |
| 2010/0281537 A1* | 11/2010 | Wang et al. | 726/22 |
| 2012/0137000 A1* | 5/2012 | Srinivasan et al. | 709/225 |
| 2012/0290842 A1* | 11/2012 | Artishdad et al. | 713/168 |
| 2012/0311020 A1* | 12/2012 | Brown | G06F 12/0862 709/203 |

OTHER PUBLICATIONS

RickTeck, Mixed Content Websites, May 13, 2011.*

(Continued)

*Primary Examiner* — Abdullahi E Salad
(74) *Attorney, Agent, or Firm* — Jared S. Goff; Goff Patent Law PLLC (57) ABSTRACT

Loading of web application pages and dependent files are optimized both in terms of load order and selective authentication. A baseline file (also referred to as the wire frame page) may include main page framework and most dependent files. Files referenced in the baseline file may be organized such that they load in an optimized fashion. The baseline file and the dependent files referenced therein may be loaded anonymously without waiting for the completion of the authentication process. The secure content may be the only authenticated request made, thus allowing most of the files to load in parallel to the longer authenticated request.

20 Claims, 6 Drawing Sheets

(56) References Cited

OTHER PUBLICATIONS

Connell, Andrew, "Designing and Developing High-Performance SharePoint Server 2007 Publishing Sites", Retrieved at <<http://msdn.microsoft.com/en-us/library/ee857096(v=office.12).aspx#odcsp2007taHighPerfSites_ImprovingPageLoadTimeinPublishingSites>>, Dec. 2009, pp. 16.

"Minimize round-trip times", Retrieved at <<http://code.google.com/speed/page-speed/docs/rtt.html#top>>, Jul. 19, 2011, pp. 10.

"Client-Side Minimal Download and Simulated Page Navigation Features", U.S. Appl. No. 13/354,164, filed Jan. 19, 2012, pp. 27.

"Server-Side Minimal Download and Error Failover", U.S. Appl. No. 13/353,963, filed Jan. 19, 2012, pp. 26.

"Minimal Download and Simulated Page Navigation Features", U.S. Appl. No. 13/310,991, filed Dec. 5, 2011, pp. 29.

"Definition of authentication in English", accessed on Dec. 20, 2016 at <<https://en.oxforddictionaries.com/definition/authentication>>, Copyright 2016 Oxford University Press, 5 Pages.

\* cited by examiner

WEB PAGE LOAD TIME REDUCTION BY OPTIMIZED AUTHENTICATION

BACKGROUND

With the proliferation of computing and networking technologies, web services are increasingly replacing locally installed applications providing a wide variety of services through generic client applications such as browsers. A range of web services such as collaborative services provide content to be rendered on client applications. Commonly, at least a portion of the content is secure content requiring authentication of the user.

In conventional web services, authentication is performed prior to transmittal of content—secure or non-secure—to the client application. Authentication may include several challenges and take a few hundred milliseconds, during which the available bandwidth is underutilized. Furthermore, rendering of content is delayed potentially impacting user experience.

In a complex web application, load time performance is an important metric. The goal is to make pages in the application load quickly. This task is complicated in that the load time of a page is not just dependent on the page itself, but also on files that the page depends on. Dependent files may include data like style sheets, images, script files, data files, etc. Decreasing the size of these files is an important approach to improve load time, but that alone is often not enough. A further concern in web application performance is the impact of authentication. As mentioned above, authentication often involves significant amounts of logic and database access and can thus slow down operations in the application.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to optimizing loading of web application pages and dependent files both in terms of load order and selective authentication. A baseline file (also referred to as the wire frame page) may include main page framework and most dependent files. Files referenced in the baseline file may be organized such that they load in an optimized fashion. The baseline file and the dependent files referenced therein may be loaded anonymously without waiting for the completion of the authentication process. The secure content may be the only authenticated request made, thus allowing most of the files to load in parallel to the longer authenticated request.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, web page loading time may be reduced by beginning to download non-secure content prior to and/or during authentication also reducing unused bandwidth. Moreover, rendering of secure content may be accelerated by downloading and caching the secure content while non-secure content needed for displaying the secure content is being downloaded and then retrieving the secure content from the local cache when the page framework is ready to render the secure content.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing web content through client applications such as browsers. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
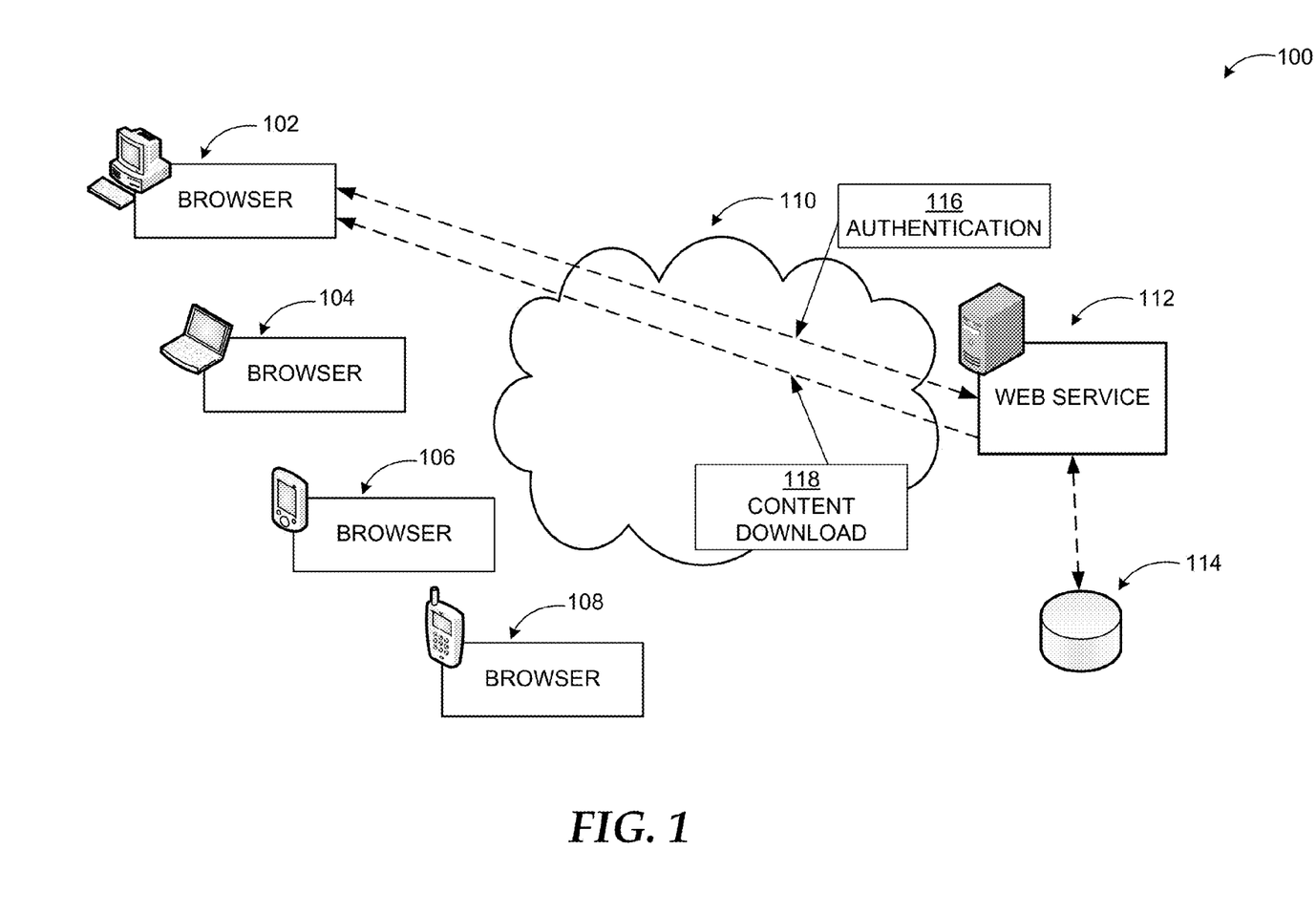
FIG. 1 illustrates an example networked system for reducing web page loading by optimizing authentication and downloading of non-secure content according to embodiments.

FIG. 1 illustrates an example networked system for reducing web page loading by optimizing authentication and downloading of non-secure content according to embodiments. As demonstrated in diagram 100, browsers 102, 104, 106, or 108 executed on various computing devices (for example, a laptop computer, a desktop computer, a smart phone, a car phone, a mobile phone, a tablet, and/or a home automation device) may communicate with a web service 112 executed on one or more servers and display content received from the web service 112. Data associated with the displayed content such as secure content or non-secure content may be stored at one or more data stores like data store 114 and retrieved by the web service 112. The computing devices executing the browser applications and the server(s) executing the web service may communicate over one or more networks 110. The system may also be a cloud-based system.

A typical communication for displaying a web page may include authentication 116 of the user by the web service and content download 118 to the respective browser application(s). Authentication 116 may include one or more challenges and exchange of multiple messages between the browser and the web service. Some of the data for authentication may also be stored at data store 114. Downloaded content for displaying the web page may include non-secure and secure content. The non-secure content may include style sheets, scripts, images, graphic files, textual data, audio/video data, and comparable data.

The web service 112 may provide a wide variety of services and associated web pages including, but not limited to, collaboration services, productivity applications, communication applications, analysis applications, database services, and comparable ones. A system according to embodiments may optimize loading of web application pages and dependent files both in terms of load order and selective authentication.

Figure 2:
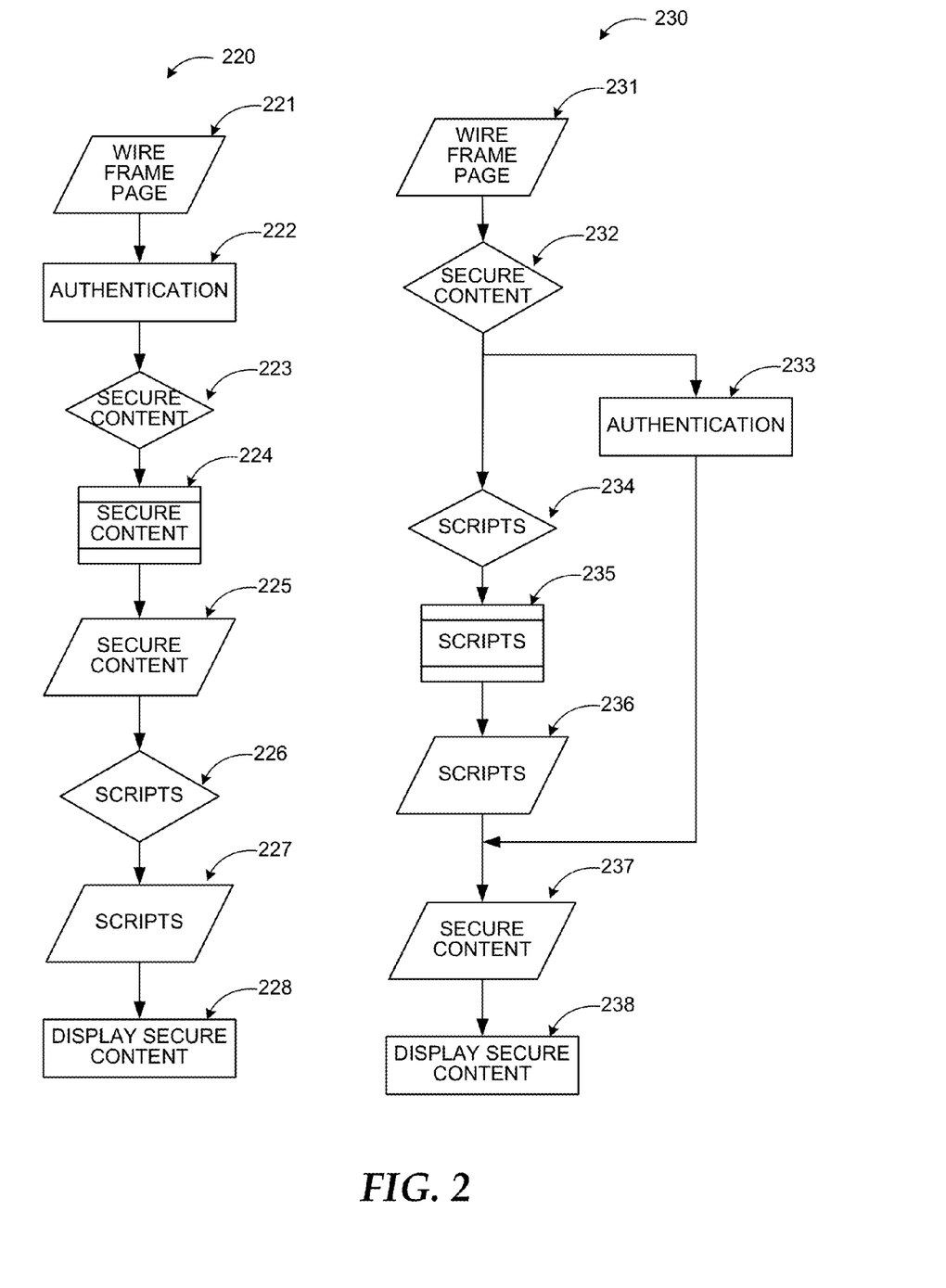
FIG. 2 compares an example web page rendering process with another example web page loading process according to embodiments.

FIG. 2 compares an example web page rendering process with another example web page loading process according to embodiments. Load time performance in a web application is complicated because the load time of a page is not just dependent on the page itself, but also on files that the page depends on. Dependent files may include data like style sheets, images, script files, data files, etc. In a conventional approach, all content including secure and non-secure content may be downloaded to a client machine after authentication. Authentication often involves significant amounts of logic and database access and can thus slow down operations in the application.

As shown in flow 220, the web page download may begin with a wire frame page 221 containing information about the structure of the web page and needed files including non-secure content. Next, the user may be authenticated (222) through exchange of multiple challenges or similar messages. Following authentication 222, needed secure content may be determined (223) and requested from the server (224). Upon downloading of the secure content (225) and other non-secure content such as images, graphic files, etc., scripts needed for the page may be determined (226) and downloaded (227) from the server. Subsequently, the secure content may be displayed (228). Waiting for the authentication process to be completed may not only waste available bandwidth, but also delay rendering of the web page impacting user experience.

Embodiments enable optimization of the loading of web application pages and dependent files both in terms of load order and selective authentication. According to some embodiments, a baseline file for the application that contains main page framework and a list of dependent files may be organized such that the non-secure content (dependent files) loads in an optimized fashion. The baseline and the dependent files referenced therein may be loaded anonymously (before or during authentication) utilizing available bandwidth and reducing delay in web page loading. Furthermore, secure content may be downloaded and locally cached following the authentication before all non-secure content is downloaded such that it can be retrieved from the local cache when the page framework is ready further reducing web page loading time.

Flow 230 illustrates an example process according to some embodiments. The process may also begin with the loading of the wire frame page 231, which may determine the needed secure content (232) and other elements needed for rendering the web page. Upon determination of needed secure content, authentication 233 may also begin. While the authentication is proceeding, needed scripts (and other files) may be determined (234) and requested (235) from the server and downloaded (236). Subsequently, the needed secure content may be downloaded (237). The downloading of the secure content may begin before completion of the downloading of non-secure content as discussed above. When non-secure content is ready at the browser, the secure content may be retrieved from the local cache and the secure content displayed (238). If the non-secure content is not completely downloaded after a predefined period following the caching of the secure content (e.g. 30 seconds), the cached secure content may be deleted (expired).

Figure 3:
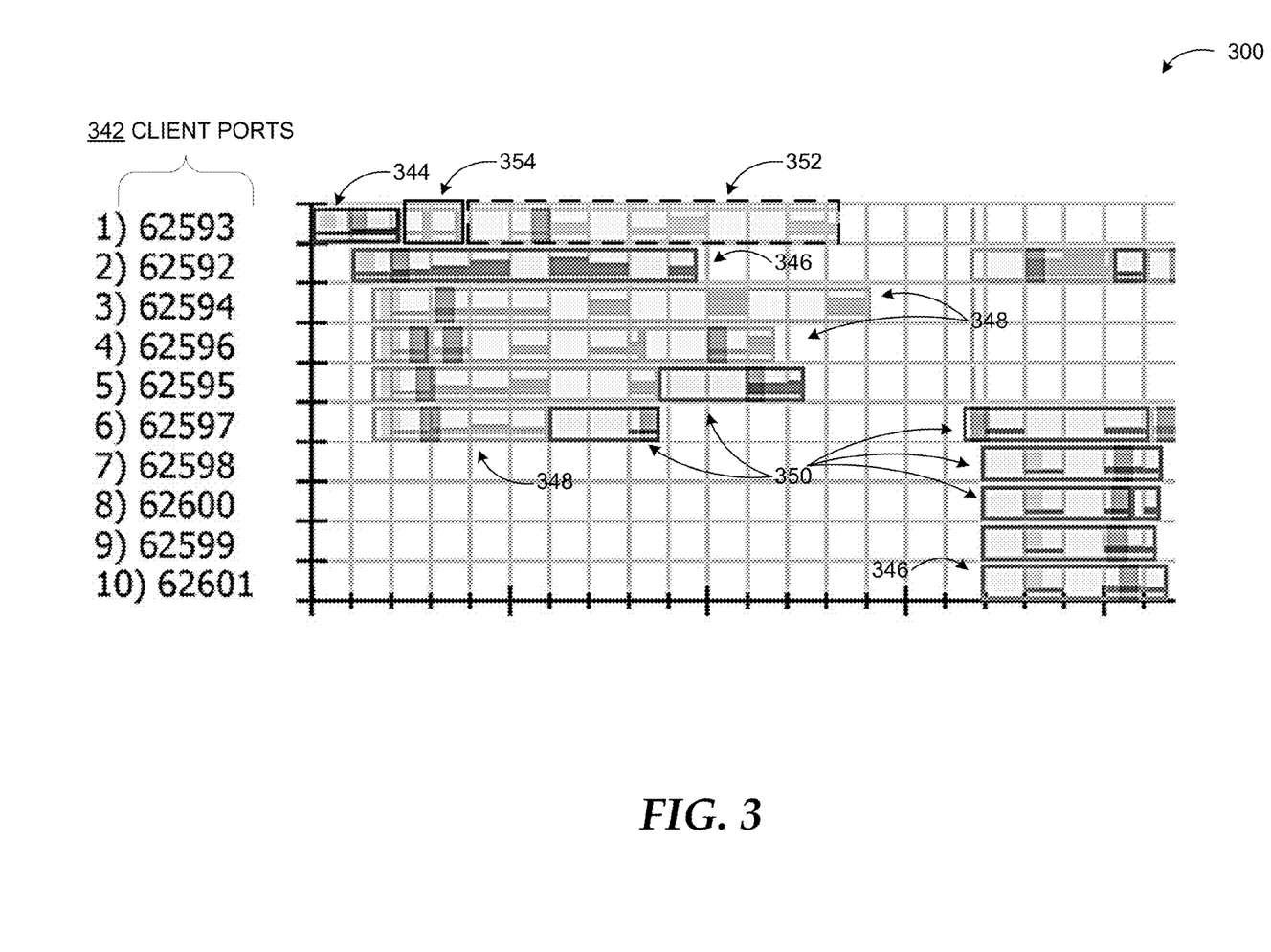
FIG. 3 illustrates an example web page download through multiple ports at a client application.

FIG. 3 illustrates an example web page download through multiple ports at a client application. As discussed above, web pages include secure and non-secure content. Commonly, most resources consumed by web pages are non-secure or anonymously accessible such as image files, scripts, style sheets, and comparable data that form a framework of the web page. The web page content itself (secure content) may require authentication though. A browser according to some embodiments may download a small, anonymous start page (wire frame) and immediately begin downloading non-secure content. Upon completion of the authentication, the browser may download authenticated content without waiting for the authentication before using bandwidth and saving approximately 300-400 milliseconds load time in some scenarios.

In some embodiments, database access may require authentication, since most database content may be considered secure content. A web site providing the web page does not have to be an anonymous (non-secure) web site. A web page is typically downloaded to a client machine through multiple ports. Some ports may be dedicated for authenticated exchange. In a system according to embodiments, at least some of the ports need to be configured for non-secure content downloading such that non-secure content can be downloaded simultaneously with the authentication process.

In diagram 300, downloading of various parts of a web page is shown across client ports 342 illustrating optimized utilization of bandwidth and reduction of loading time. Loading of the web page may begin with downloading of the baseline file or wire frame 344. Secure content 352 may begin to be downloaded following authentication 354. Differently from conventional approaches, non-secure content such as style sheet files 346 and script files 348 may begin downloading before the authentication begins and while the authentication is proceeding. Non-secure content may also include image files 350, which may be downloaded before or after the secure content 352 is downloaded.

As shown in diagram 300, downloading of the secure content 352 may be completed before all non-secure content is completely downloaded. Thus, the secure content 352 may be locally cached until the non-secure content is completely downloaded and page is ready to be rendered or a predefined period expires. In the latter case, the secure content may be deleted from the local cache for security reasons. If the non-secure content is downloaded before the predefined period expires, the secure content may be displayed within the framework formed by the non-secure content.

The example systems in FIG. 1 through 3 have been described with specific configurations, applications, and interactions. Embodiments are not limited to systems according to these examples. A system for reducing web page loading time by optimizing authentication may be implemented in configurations employing fewer or additional components and performing other tasks. Furthermore, specific protocols and/or interfaces may be implemented in a similar manner using the principles described herein.

Figure 4:
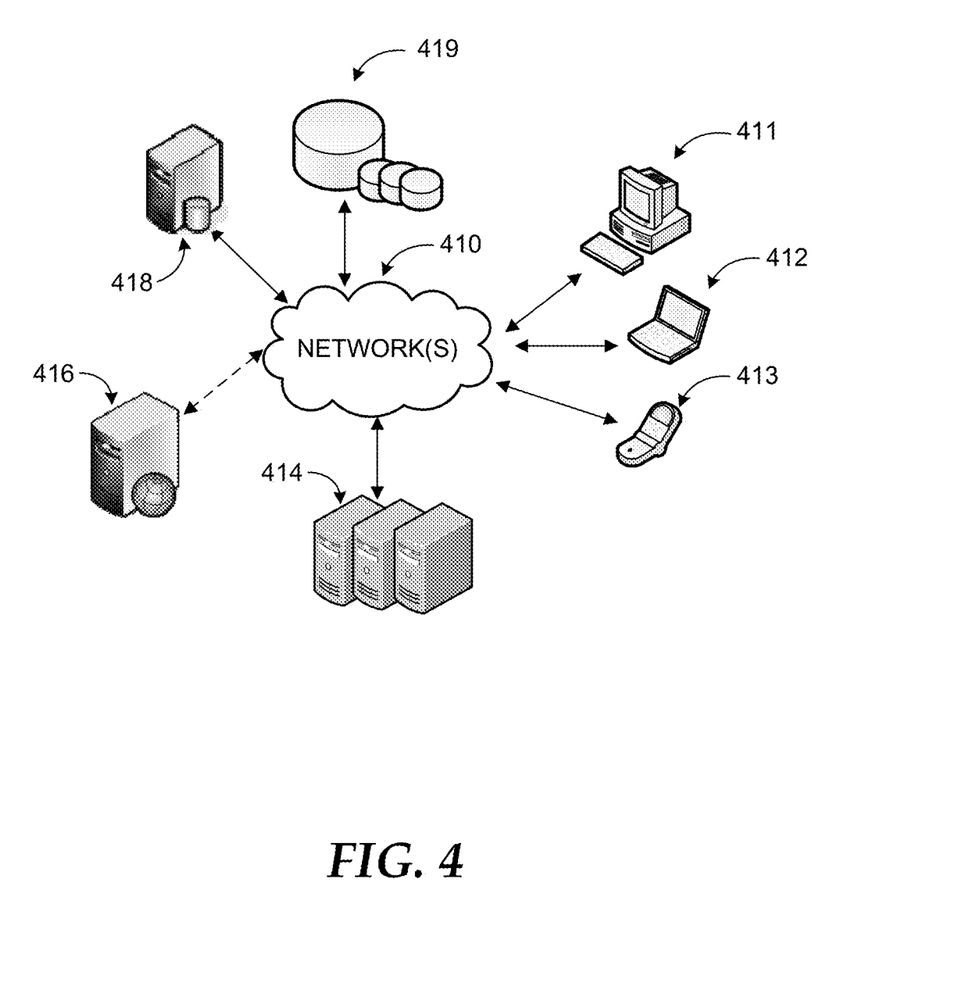
FIG. 4 is a networked environment, where a system according to embodiments may be implemented.

FIG. 4 is an example networked environment, where embodiments may be implemented. A system for reducing web page loading time by optimizing authentication may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications such as browsers executed on any of the client devices 411-413 may facilitate communications via application(s) executed by servers 414, or on individual server 416. A web application executed on one of the servers may provide secure and non-secure content to the client applications with optimized ordering through a baseline file and authentication such that web page loading time is reduced without compromising security. The web application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for reducing web page loading by optimizing authentication and downloading of non-secure content. Furthermore, the networked environments discussed in FIG. 4 are for illustration purposes only. Embodiments are not limited to the example applications, modules, or processes.

Figure 5:
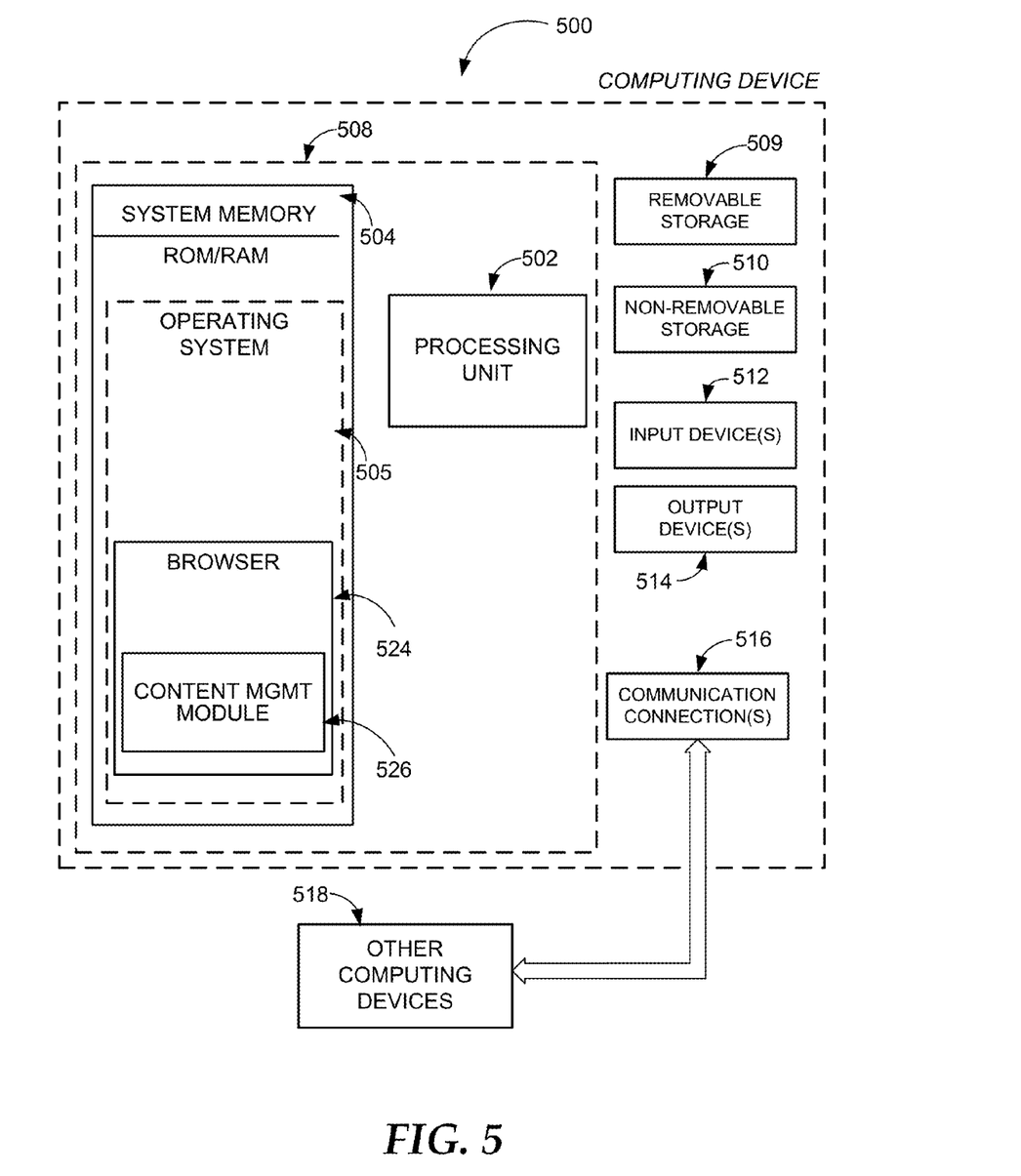
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a browser application capable of reducing web page loading by optimizing authentication and downloading of non-secure content according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as an browser application 524 and a content management module 526.

The browser application 524 may facilitate access to services provided by a web application or service. The content management module 526 in conjunction with the browser application 524 may enable downloading of non-secure content before and/or during an authentication process to utilize available bandwidth and reduce web page loading time. Furthermore, some or all of the secure content may be downloaded and cached while needed non-secure content is being downloaded and subsequently retrieved from local cache for faster rendering. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
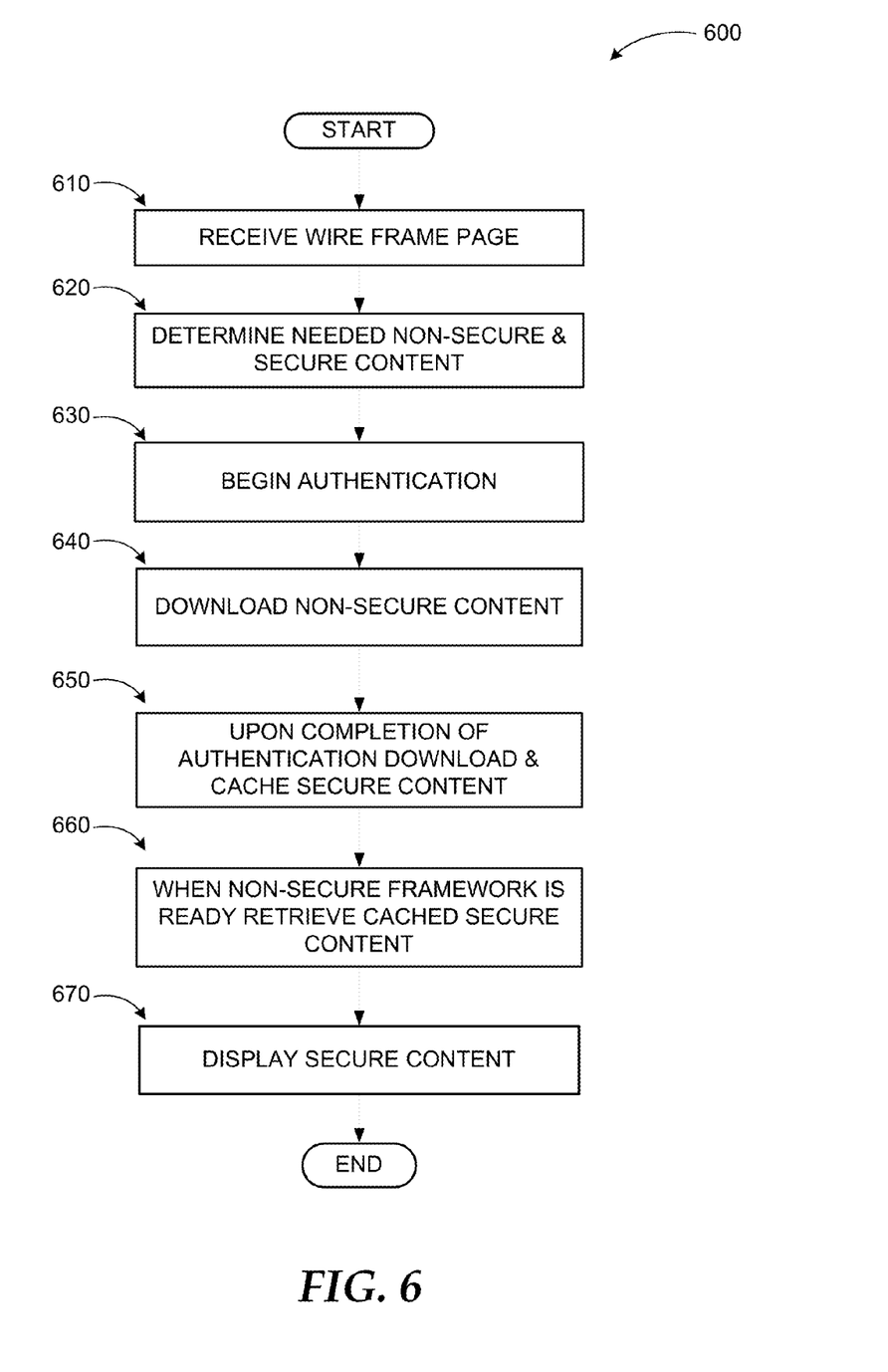
FIG. 6 illustrates a logic flow diagram for a process of optimizing authentication and non-secure content download to reduce web page loading according to embodiments.

FIG. 6 illustrates a logic flow diagram for a process of optimizing authentication and non-secure content download to reduce web page loading according to embodiments. Process 600 may be implemented on a computing device or similar electronic device capable of executing instructions through a processor.

Process 600 begins with operation 610, where a wire frame page may be received. The wire frame page may include information associated with the needed structure and files such as style sheets, image files, scripts, and so on to display a web page and associated secure content. At operation 620, the wire frame page may determine needed non-secure and secure content based on the user's request, settings, configurations, etc. At operation 630, an authentication process involving multiple challenges and exchange of communications between the browser application and the web application may begin. Following the start of the authentication process or simultaneously with it, non-secure content may begin to be downloaded from the web application at operation 640.

At operation 650, secure content may be downloaded and locally cached upon completion of the authentication process while the non-secure content is still being downloaded. When the non-secure content and framework for displaying the secure content is ready, the secure content may be retrieved from the local cache at operation 660 further accelerating the web page loading process. The secure content may then be displayed at operation 670.

The operations included in process 600 are for illustration purposes. Optimizing authentication and non-secure content download to reduce web page loading may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for reducing web page load time, the method comprising:
   downloading a baseline file for a requested web page;
   determining through the baseline file non-secure content for the web page;
   beginning to download the non-secure content anonymously prior to or simultaneously with an authentication process for secure content associated with the web page, with the beginning of the downloading of the non-secure content occurring prior to completion of the authentication process;
   upon completion of the authentication process, downloading the secure content; and
   displaying the web page including the secure content upon completion of downloading the non-secure content and the secure content.

2. The method of claim 1, further comprising:
   beginning to download the secure content prior to the completion of downloading the non-secure content;
   caching the downloaded secure content; and
   retrieving the secure content from a local cache following the completion of downloading the non-secure content.

3. The method of claim 2, further comprising:
   deleting the cached secure content if a predefined period expires prior to the completion of downloading the non-secure content.

4. The method of claim 1, wherein the baseline file includes a main page framework and a list of dependent files.

5. The method of claim 4, wherein the dependent files are ordered in the baseline file for optimized downloading.

6. The method of claim 1, wherein the non-secure content includes at least one from a set of: style sheets, scripts, images, graphic files, textual data, audio data and video data.

7. The method of claim 1, wherein the secure content includes database content.

8. The method of claim 1, further comprising:
   configuring at least a portion of available ports for receiving the non-secure content without authentication.

9. The method of claim 1, wherein the baseline file is used to determine one or more scripts for rendering the web page based on at least one from a set of: a list of non-secure content files in the baseline file, a user request for the web page, a user computing device setting, and a user browser configuration.

10. The method of claim 1, wherein a web service providing the web page is configured to provide one of: a collaboration service, a productivity application, a communication application, an analysis application, and a database service.

11. A computing system for reducing web page load time, comprising:

at least one memory storing computer-executable instructions;

at least one processor coupled to the at least one memory, with the instructions being such that when the instructions are executed by the at least one processor, the at least one processor performs the following acts via a browser application:

download a baseline file for a requested web page;

determine through the baseline file non-secure dependent files for the web page;

begin to download the non-secure dependent files anonymously prior to or simultaneously with an authentication process for secure content associated with the web page, with the beginning of the downloading of the non-secure dependent files occurring prior to completion of the authentication process;

upon completion of the authentication process, download the secure content; and display the web page including the secure content upon completion of downloading the non-secure dependent files and the secure content.

12. The computing system of claim 11, wherein the acts further comprise:

begin to download the secure content prior to the completion of downloading the non-secure dependent files;

cache the downloaded secure content;

retrieve the secure content from a local cache following the completion of downloading the non-secure dependent files; and delete the cached secure content if a predefined period expires prior to the completion of downloading the non-secure dependent files.

13. The computing system of claim 11, wherein the acts further comprise:

determine available ports at a computing device in the computing system; and configure at least a portion of available ports for receiving the non-secure dependent files without authentication.

14. The computing system of claim 11, wherein the acts further comprise receiving the web page from one of a web-based application and a cloud-based application enabling a user to access secure and non-secure content.

15. The computing system of claim 11, wherein a computing device to which the web page is downloaded is one of: a laptop computer, a desktop computer, a smart phone, a car phone, a mobile phone, a tablet computer, and a home automation device.

16. The computing system of claim 11, wherein the baseline file includes a main page framework and a list of dependent files.

17. A computer-readable memory device having computer-executable instructions embodied thereon that, when executed by at least one processor, cause at least one processor to perform acts comprising:

downloading a baseline file for a requested web page;

determining through the baseline file non-secure content for the web page;

beginning to download the non-secure content anonymously prior to or simultaneously with an authentication process for secure content associated with the web page, with the beginning of the downloading of the non-secure content occurring prior to completion of the authentication process;

after completion of the authentication process, downloading the secure content;

displaying the web page including the secure content upon completion of downloading the non-secure content and the secure content;

beginning to download the secure content prior to the completion of downloading the non-secure content;

caching the downloaded secure content;

retrieving the secure content from a local cache following the completion of downloading the non-secure content; and deleting the cached secure content if a predefined period expires prior to the completion of downloading the non-secure content.

18. The computer-readable memory device of claim 17, wherein the authentication process for secure content is an authentication process that is required for the downloading of the secure content.

19. The computer-readable memory device of claim 17, wherein the baseline file includes a main page framework and a list of dependent files.

20. The computer-readable memory device of claim 17, wherein the acts further comprise configuring at least a portion of available ports for receiving the non-secure content without authentication.

* * * * *